United States Patent
Wang et al.

(10) Patent No.: US 11,526,448 B2
(45) Date of Patent: Dec. 13, 2022

(54) DIRECT MAPPED CACHING SCHEME FOR A MEMORY SIDE CACHE THAT EXHIBITS ASSOCIATIVITY IN RESPONSE TO BLOCKING FROM PINNING

(71) Applicant: Intel Corporation, Santa Clara, CA (US)

(72) Inventors: Zhe Wang, Portland, OR (US); Alaa R. Alameldeen, Hillsboro, OR (US); Yi Zou, Portland, OR (US); Gordon King, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/586,251

(22) Filed: Sep. 27, 2019

(65) Prior Publication Data
US 2020/0026655 A1    Jan. 23, 2020

(51) Int. Cl.
*G06F 12/0811*   (2016.01)
*G06F 12/0873*   (2016.01)
*G06F 12/02*   (2006.01)
*G06F 13/16*   (2006.01)
*G06F 12/0897*   (2016.01)

(52) U.S. Cl.
CPC ...... *G06F 12/0873* (2013.01); *G06F 12/0246* (2013.01); *G06F 12/0811* (2013.01); *G06F 12/0897* (2013.01); *G06F 13/1668* (2013.01); *G06F 2212/1021* (2013.01)

(58) Field of Classification Search
CPC ............. G06F 12/0873; G06F 12/0246; G06F 12/0811; G06F 12/0897; G06F 13/1668; G06F 2212/1021
See application file for complete search history.

(56) References Cited

U.S. PATENT DOCUMENTS

| | | | |
|---|---|---|---|
| 7,325,098 B1* | 1/2008 | Aho ..................... | G06F 12/0811 711/118 |
| 2007/0239938 A1* | 10/2007 | Pong ................... | G06F 12/0895 711/122 |
| 2009/0150617 A1* | 6/2009 | Bell, Jr. ................ | G06F 12/125 711/136 |
| 2012/0324172 A1* | 12/2012 | Rabinovitch ......... | G06F 12/121 711/136 |

(Continued)

OTHER PUBLICATIONS

Young, et al., "ACCORD: Enabling Associativity for Gigascale DRAM Caches by Coordinating Way-Install and Way-Prediction", 2018 ACM/IEEE 45th Annual International Symposium on Computer Architecture (ISCA), Los Angeles, CA, USA, 2018, pp. 328-339.

*Primary Examiner* — Michael Sun
(74) *Attorney, Agent, or Firm* — Compass IP Law PC

(57) ABSTRACT

An apparatus is described. The apparatus includes a memory controller to interface with a multi-level memory, where, an upper level of the multi-level memory is to act as a cache for a lower level of the multi-level memory. The memory controller has circuitry to determine: i) an original address of a slot in the upper level of memory from an address of a memory request in a direct mapped fashion; ii) a miss in the cache for the request because the slot is pinned with data from another address that competes with the address; iii) a partner slot of the slot in the cache in response to the miss; iv) whether there is a hit or miss in the partner slot in the cache for the request.

18 Claims, 8 Drawing Sheets

(56) References Cited

U.S. PATENT DOCUMENTS

| | | | |
|---|---|---|---|
| 2014/0129767 A1* | 5/2014 | Ramanujan | ....... G11C 11/40615 |
| | | | 711/105 |
| 2014/0304475 A1* | 10/2014 | Ramanujan | ............. G06F 11/07 |
| | | | 711/135 |
| 2016/0283392 A1* | 9/2016 | Greenfield | ............ G06F 12/128 |
| 2017/0083443 A1 | 3/2017 | Wang et al. | |
| 2017/0091093 A1 | 3/2017 | Wang et al. | |
| 2017/0206165 A1* | 7/2017 | Lim | ...................... G11C 11/408 |
| 2017/0277633 A1 | 9/2017 | Wilkerson et al. | |
| 2017/0371795 A1 | 12/2017 | Wang et al. | |
| 2018/0188797 A1 | 7/2018 | Wang et al. | |
| 2018/0189182 A1 | 7/2018 | Wang et al. | |
| 2018/0285274 A1 | 10/2018 | Teran et al. | |
| 2019/0004952 A1 | 1/2019 | Wang et al. | |
| 2019/0042145 A1 | 2/2019 | Pham et al. | |
| 2019/0042422 A1 | 2/2019 | Wang et al. | |
| 2019/0095332 A1 | 3/2019 | Wang et al. | |
| 2019/0102314 A1 | 4/2019 | Wang et al. | |
| 2019/0163628 A1 | 5/2019 | Wang et al. | |
| 2019/0163639 A1 | 5/2019 | Wu et al. | |
| 2019/0179764 A1 | 6/2019 | Wang et al. | |

* cited by examiner

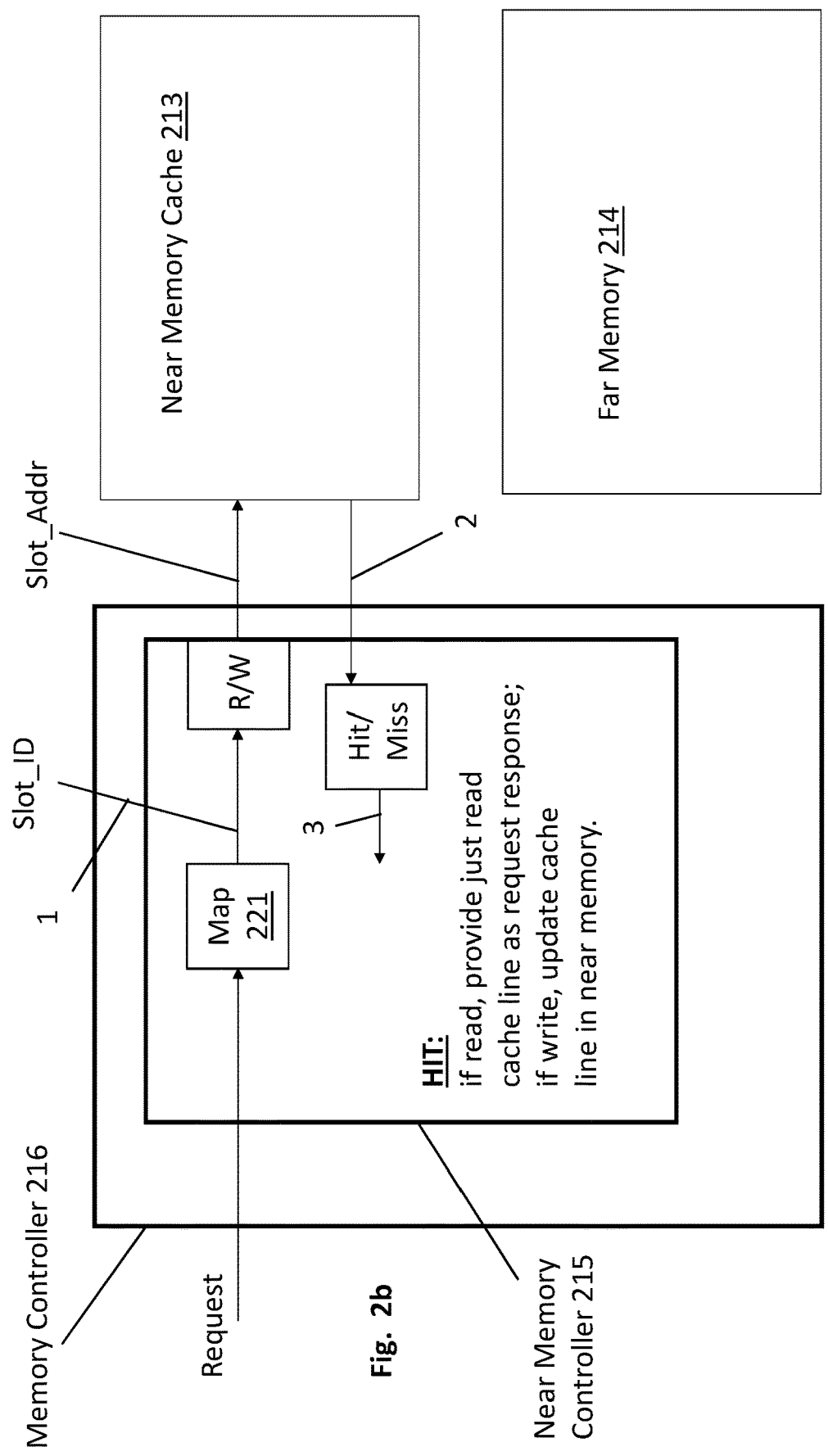

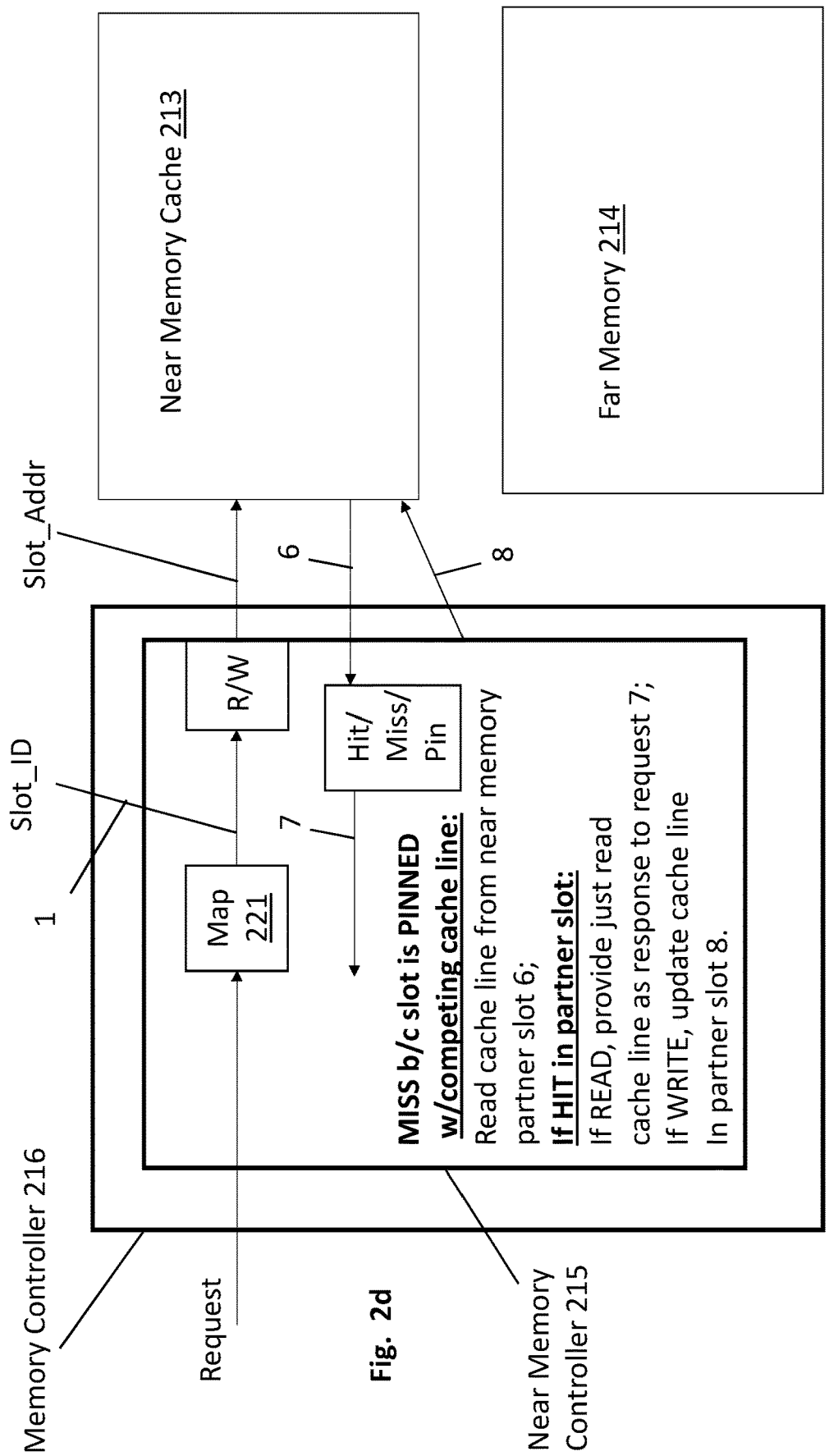

DIRECT MAPPED CACHING SCHEME FOR A MEMORY SIDE CACHE THAT EXHIBITS ASSOCIATIVITY IN RESPONSE TO BLOCKING FROM PINNING

FIELD OF INVENTION

The field of invention pertains generally to the computing sciences, and, more specifically, to a direct mapped caching scheme for a memory side cache that exhibits associativity in response to blocking from pinning.

BACKGROUND

Computing system designers are continually seeking ways to improve the performance of the systems they design. One area of focus is memory that is under high demand such as system memory (also referred to as main memory). Here, if the performance of a memory that is under high demand can be improved, performance of the system and/or component(s) that use the memory will also be improved.

FIGURES

A better understanding of the present invention can be obtained from the following detailed description in conjunction with the following drawings, in which:

FIG. 1 shows a computer with a multi-level system memory having a near memory that acts as a cache for a far memory;

FIGS. 2a through 2e demonstrate a direct mapped cache accessing scheme of the near memory that includes some associativity;

DETAILED DESCRIPTION

Figure 1:
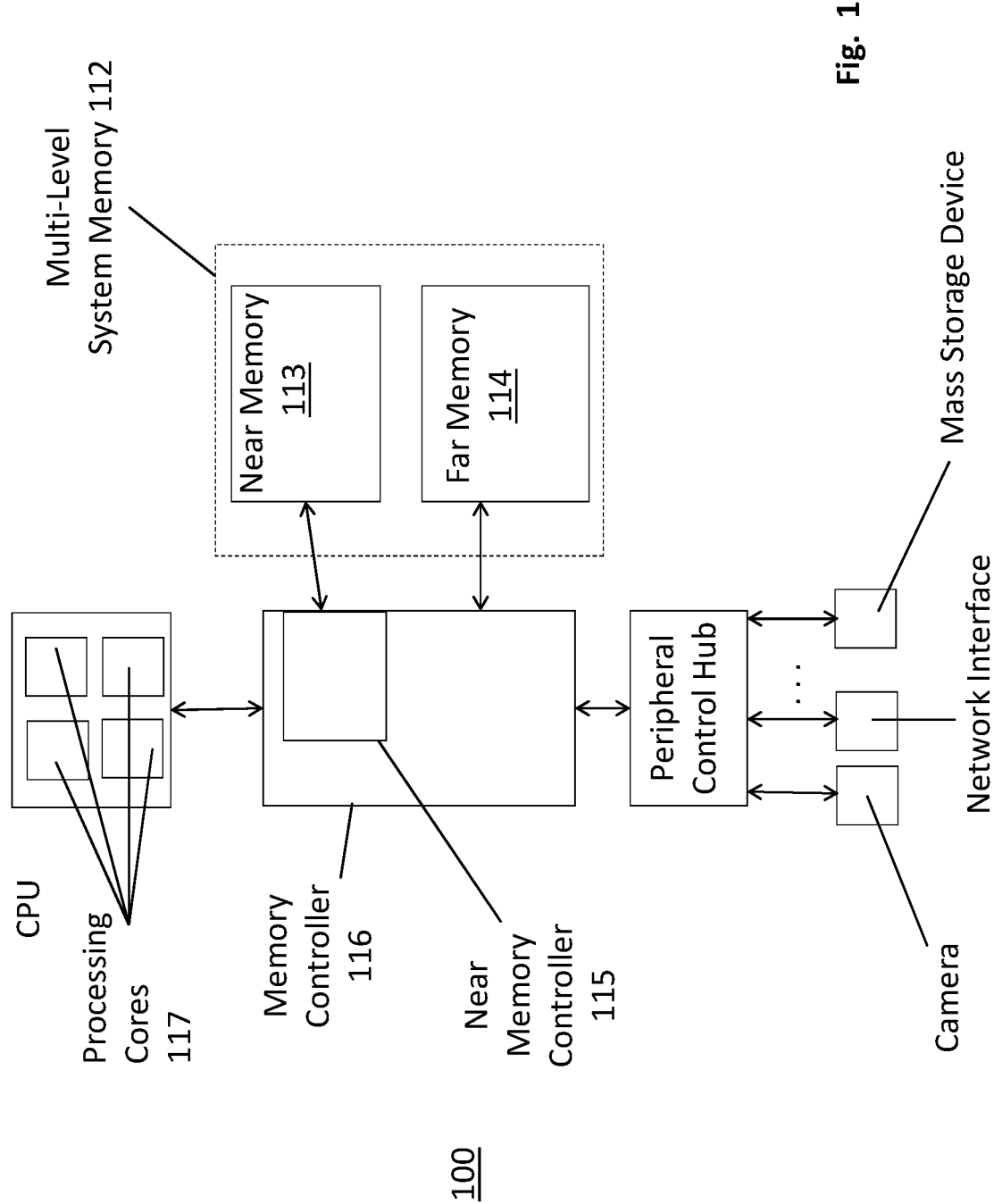

FIG. 1 shows an embodiment of a computing system 100 having a multi-tiered or multi-level system memory 112. According to various embodiments, a smaller, faster near memory 113 may be utilized as a cache for a larger, slower far memory 114. In various embodiments, near memory 113 is used to store the more frequently accessed items of program code and/or data that are kept in system memory 112. By storing the more frequently used items in near memory 113, the system memory 112 will be observed as faster because the system will often read/write from/to items that are being stored in faster near memory 113.

According to various embodiments, near memory 113 has lower access times than the lower tiered far memory 114. For example, the near memory 113 may exhibit reduced access times by having a faster clock speed than the far memory 114. Here, the near memory 113 may be a faster (e.g., lower access time), volatile system memory technology (e.g., high performance dynamic random access memory (DRAM) and/or SRAM memory cells) co-located with the memory controller 116. By contrast, far memory 114 may be either a volatile memory technology implemented with a slower clock speed (e.g., a DRAM component that receives a slower clock) or, e.g., a non-volatile memory technology that is slower (e.g., has longer access time(s)) than volatile/DRAM memory or whatever technology is used for near memory 113.

For example, far memory 114 may be comprised of an emerging non-volatile random access memory technology such as, to name a few possibilities, a phase change based memory, a three dimensional crosspoint memory with non-volatile storage cells, "write-in-place" non-volatile main memory devices, memory devices having storage cells composed of chalcogenide, multiple level flash memory, multi-threshold level flash memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc.

Notably, a number of emerging non-volatile random access memory technologies integrate three dimensional arrays of resistive storage cells above the semiconductor substrate of a semiconductor chip (e.g., formed within the metal wiring features that are patterned above the substrate, e.g., in a crosspoint accessing structure where a storage cell resides between two wires that run perpendicular to one another). Here, the different stored values of a storage cell correspond to different resistances that the storage cell is set to.

Any of these technologies may be byte addressable so as to be implemented as a system memory in a computing system (also referred to as a "main memory") rather than traditional block or sector based non-volatile mass storage.

Emerging non-volatile random access memory technologies typically have some combination of the following: 1) higher storage densities than DRAM (e.g., by being constructed in three-dimensional (3D) circuit structures (e.g., a crosspoint 3D circuit structure)); 2) lower dormant power consumption densities than DRAM (e.g., because they do not need refreshing); and/or, 3) access latency that is slower than DRAM yet still faster than traditional non-volatile memory technologies such as FLASH. The latter characteristic in particular permits various emerging non-volatile memory technologies to be used in a system/main memory role rather than a traditional mass storage role (which is the traditional architectural location of non-volatile storage).

In various embodiments far memory 114 acts as a true system/main memory in that it supports finer grained data accesses (e.g., cache lines) rather than only larger based "block" or "sector" accesses associated with traditional, non-volatile mass storage (e.g., solid state drive (SSD), hard disk drive (HDD)), and/or, otherwise acts as a byte addressable memory that the program code being executed by processor(s) of the CPU operate out of.

In various embodiments, system memory may be implemented with dual in-line memory modules (DIMMs) where a single DIMM has both volatile (e.g., DRAM) and (e.g., emerging) non-volatile memory semiconductor chips disposed on it. In other configurations DIMMs having only DRAM chips may be plugged into a same system memory channel (e.g., a double data rate (DDR) channel) with DIMMs having only non-volatile system memory chips as the system memory storage medium.

In another possible configuration, a memory device such as a DRAM device functioning as near memory 113 may be assembled together with the memory controller 116 and processing cores 117 onto a single semiconductor device (e.g., as embedded DRAM) or within a same semiconductor package (e.g., stacked on a system-on-chip that contains, e.g., the CPU, memory controller, peripheral control hub, etc.). Far memory 114 may be formed by other devices, such as slower DRAM or emerging non-volatile memory and may be attached to, or integrated in the same package as well. Alternatively, far memory may be external to a package that contains the CPU cores and near memory devices.

A far memory controller may also exist between the main memory controller and far memory devices. The far memory controller may be integrated within a same semiconductor chip package as the CPU cores and a main memory controller, or, may be located outside such a package (e.g., by being integrated on a DIMM having far memory devices).

With far memory 114 typically being implemented as non-volatile system memory, in various embodiments, far memory 114 can connect to the main memory controller 116 through a standard system memory interface (such as a JEDEC DDR memory channel where the far memory devices are disposed on, e.g., one or more JEDEC DDR memory channel compliant DIMMs), and/or, can connect to the main memory controller through an interface that traditionally has been used for mass storage devices (e.g., PCIe, NVMe) but that has been functionally extended to accommodate byte addressable accessing and/or other smaller grained accessing schemes (e.g., cache line accesses) that are associated with system/main memory accesses rather than mass storage accesses.

In various embodiments, at least some portion of near memory 113 has its own system memory address space apart from the system addresses that have been assigned to far memory 114 locations. In this case, the portion of near memory 113 that has been allocated its own system memory address space can act, e.g., as a higher priority level of system memory (because it is faster than far memory 114). In further embodiments, some other portion of near memory 113 (or all of near memory) can also act as a memory side cache that caches the most frequently accessed items from main memory (which may service more than just the CPU core(s) such as a GPU, peripheral, network interface, etc.) or as a last level CPU cache (which only services CPU core(s)).

In the case where near memory 113 acts as a "memory side" cache for far memory 114, the near memory 113 may be used differently than a CPU level cache in that the entries (e.g., cache lines) of data that are more frequently written to and/or read from system memory 112 are present in near memory 113, whereas, in the case of a CPU level cache, entries of data that are more frequently written to and/or read by the processing cores/CPU 117 are present in a CPU level cache (computing systems often have multiple levels of CPU caches where cache lines that are most frequently accessed by the cores/CPU 117 are kept in the highest level CPU caches while lesser accessed cache lines are kept in lower level CPU caches).

The distinction between a memory side cache and a CPU level cache is particularly noticeable if the computing system includes components other than the cores/CPU 117 that heavily use system memory (e.g., a graphics processor). Here, data and/or program code of such other components may populate the near memory cache along with CPU data and/or program code.

Different types of near memory caching architectures are possible (e.g., direct mapped, set associative, etc.). In general, a cache line that is kept in near memory cache has an associated "tag" based on its address. When a memory request is received, the near memory controller determines whether the tag of the request's address matches the tag of the cache line kept in the near memory cache slot(s) that the request's address maps so. If so, there is a hit in near memory cache (the cache line targeted by the memory request exists in near memory). If not, there is miss in the near memory cache.

Because the capacity of near memory can be very large, it is difficult to integrate a structure in the near memory controller 115 that can keep the respective tags of all the cache lines that are resident in near memory cache 113. As such, the tag information is appended to the cache lines that are stored in near memory cache 113 as meta-data (that is, the tag information is kept in near memory cache 113).

For example, according to one embodiment, each cache line that is stored in near memory cache 113 includes 64 bytes (64 B) of data and an extra 8 bytes (8 B) of meta-data. That meta-data includes: 1) the tag of the cache line data (which is some segment of the cache line's address); 2) whether the cache line's data is valid; 3) whether the cache line's data is shared; 4) whether the cache line is dirty (meaning it has newer data than its "older" version in far memory); and, 5) error correcting codes (ECC) information.

When a request is received by the memory controller 116, the near memory controller 115 maps the request's address to the slot(s) in near memory 113 where the targeted cache line might be stored. The near memory controller 115 then reads the respective cache line(s) from these slot(s) and examines the tag information within the meta-data. A cache hit is recognized if the request's tag matches a meta-data tag.

A problem with set associative caching schemes is that frequently a number of accesses need to be made to near memory 113 before a hit/miss decision can be made for any particular request. Here, a set associative scheme maps any one system memory address to any one of multiple slots in the near memory cache 113. For example, an N-way set associative cache can store a single cache line in any of N different slots in the near memory (a slot in near memory can hold one cache line). When a memory request is received, the near memory controller 115 performs a hash on the request's address to identify the N different slots that the request maps to. The near memory controller then proceeds to perform up to N read operations from the N different slots to access the cache lines in these slots and their corresponding meta-data to determine whether there is a cache hit or cache miss.

Because near memory devices can be separate devices than the system-on-chip (SOC) that the memory controller is integrated upon, each access to a cache line slot (each cache line read from near memory 113) is an "off-chip" access that consumes considerably more time than "on-chip" accesses do. As such, although an N way set associative cache makes more cache space available to any particular system memory address, the benefit is mitigated because a potentially large amount of time is consumed making off chip accesses before a hit/miss decision can formally be made.

As such, in various embodiments, a direct mapped cache accessing scheme is used instead. In the case of a direct mapped cache, a system memory address maps to only one near memory cache line slot. As such, when the memory controller 116 receives a memory request, the near memory controller 115 determines the single cache line slot in near memory 113 that the request's address maps to and reads the cache line that is currently resident in that slot from near memory 113. If the tag in the meta-data of the cache line that was read from the slot matches the tag of the request's address, there is cache hit, otherwise, there is a cache miss. As such, in the case of a direct mapped cache, only one "off-chip" access is consumed when determining whether or not a cache hit or miss has occurred. Notably, however, multiple different system memory address can map to a same near memory slot thereby causing contention for the slot over the runtime of the system amongst the different system memory addresses that map to it.

According to nominal direct mapped read/write behavior, in the case of a read, if there is a cache hit, the cache line that was read from near memory 113 is provided to the requestor by the memory controller 116. If there was a cache miss, the request is re-directed to far memory 114. The targeted cache line is then read from far memory 114, forwarded to the requester and written into its corresponding slot in near memory 113. The writing of the cache line into near memory 113 can cause the eviction to far memory of a competing dirty cache line that was occupying the slot.

In the case of a write, if there is a cache hit, the cache line that was read from near memory is updated with the new information that was appended to the write request (e.g., at byte granularity) and then written back to the slot in near memory 113. If there is a cache miss, the targeted cache line is read from far memory 114, updated with the new information and then written into its corresponding slot in near memory 113 (again, the writing of the cache line into near memory can cause the eviction to far memory of a competing dirty cache line that was occupying the slot).

Notably, according to the above scheme, the most recently requested cache line that maps to a particular slot is written into the slot as part of completing a response to a request. Although the direct mapped scheme reduces the number of off-chip accesses needed to determine whether there is a cache hit or cache miss, there is some performance loss because of the restriction that a system memory address can map to only one slot in near memory cache 113. The performance loss is particularly noticeable when a large number of different system memory addresses that map to a same slot are frequently used. In this case, there will be repeated contention amongst these addresses for their one slot.

The contention problem can be even more troublesome if a particular near memory cache slot is permitted to "pin" the data of a particular system memory address that maps to the slot. Here, the cache line associated with the address will essentially enjoy permanent residence in the near memory cache slot at the total exclusion of the other system memory addresses and their associated cache lines that map to the same slot. That is, the other system memory addresses are totally blocked from near memory cache 113.

FIGS. 2a through 2e provide an overview of an improved near memory cache accessing algorithm that incorporates some associativity to avoid total blocking of addresses that map to a near memory cache slot whose content is pinned with data having a different, competing address. At the same time, the cache accessing algorithm substantially maintains directed mapped caching behavior so that the aforementioned access inefficiency of large N way set associative caches is substantially avoided.

Figure 2A:
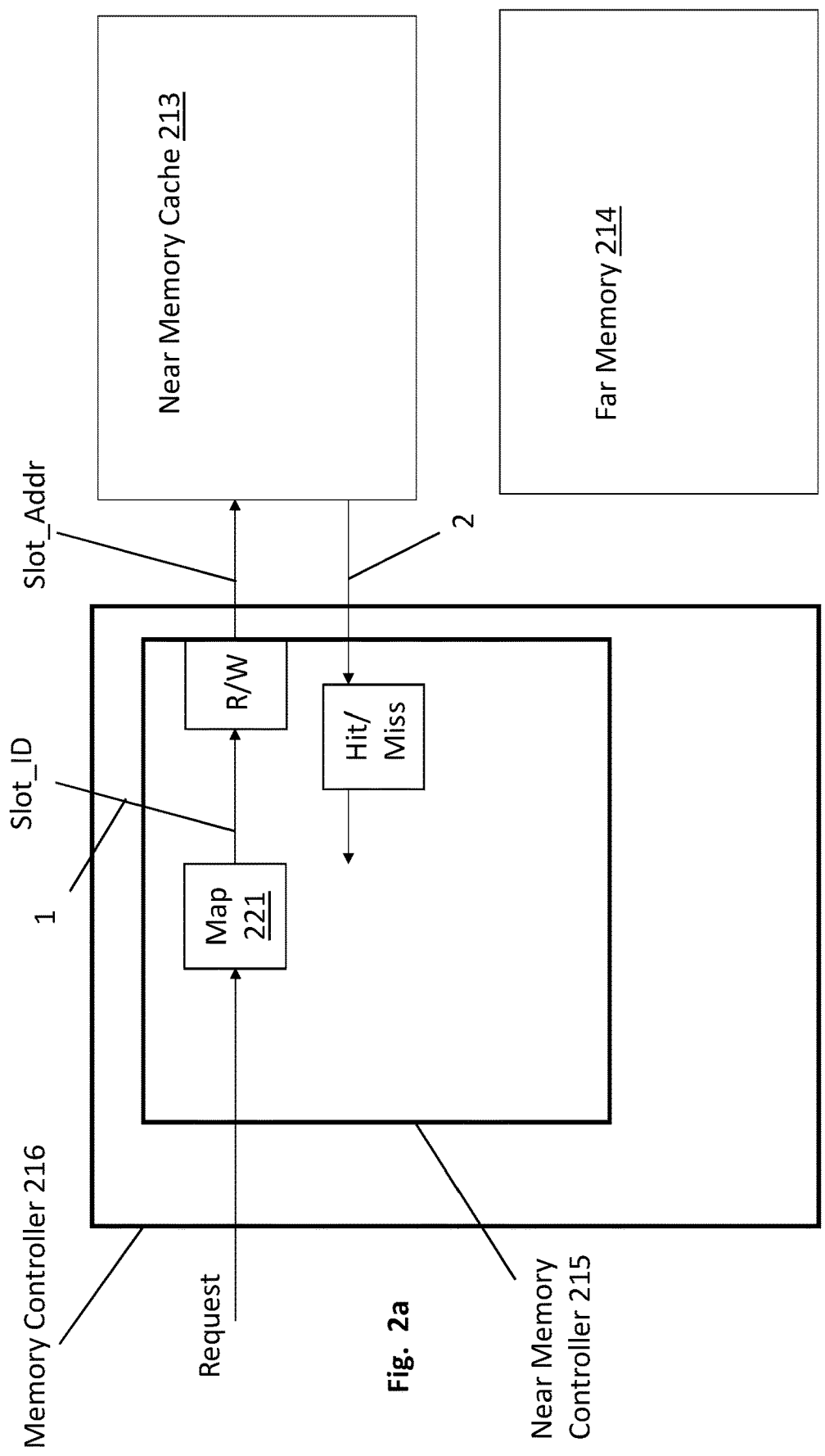

According to the near memory cache accessing algorithm of FIGS. 2a through 2e, referring first to FIG. 2a, the near memory cache 213 is accessed mainly according to a direct mapped accessing scheme as described above. That is, each system memory address maps to one slot in the near memory cache 213, and, multiple, different system memory addresses map to a same slot. These multiple, different addresses effectively compete for the single cache line slot they map to.

For any memory access request, the request's address is mapped 1 to its appropriate slot and the cache line that is currently stored in that slot is read 2 from near memory 213. If there is a hit, referring to FIG. 2b, the request is serviced from the cache line slot 3. Here, in the case of a read, the cache line that was just read from near memory is used as the response to the request, in the case of a write, the data that was appended to the request is written over the data in the cache line slot.

Figure 2C:
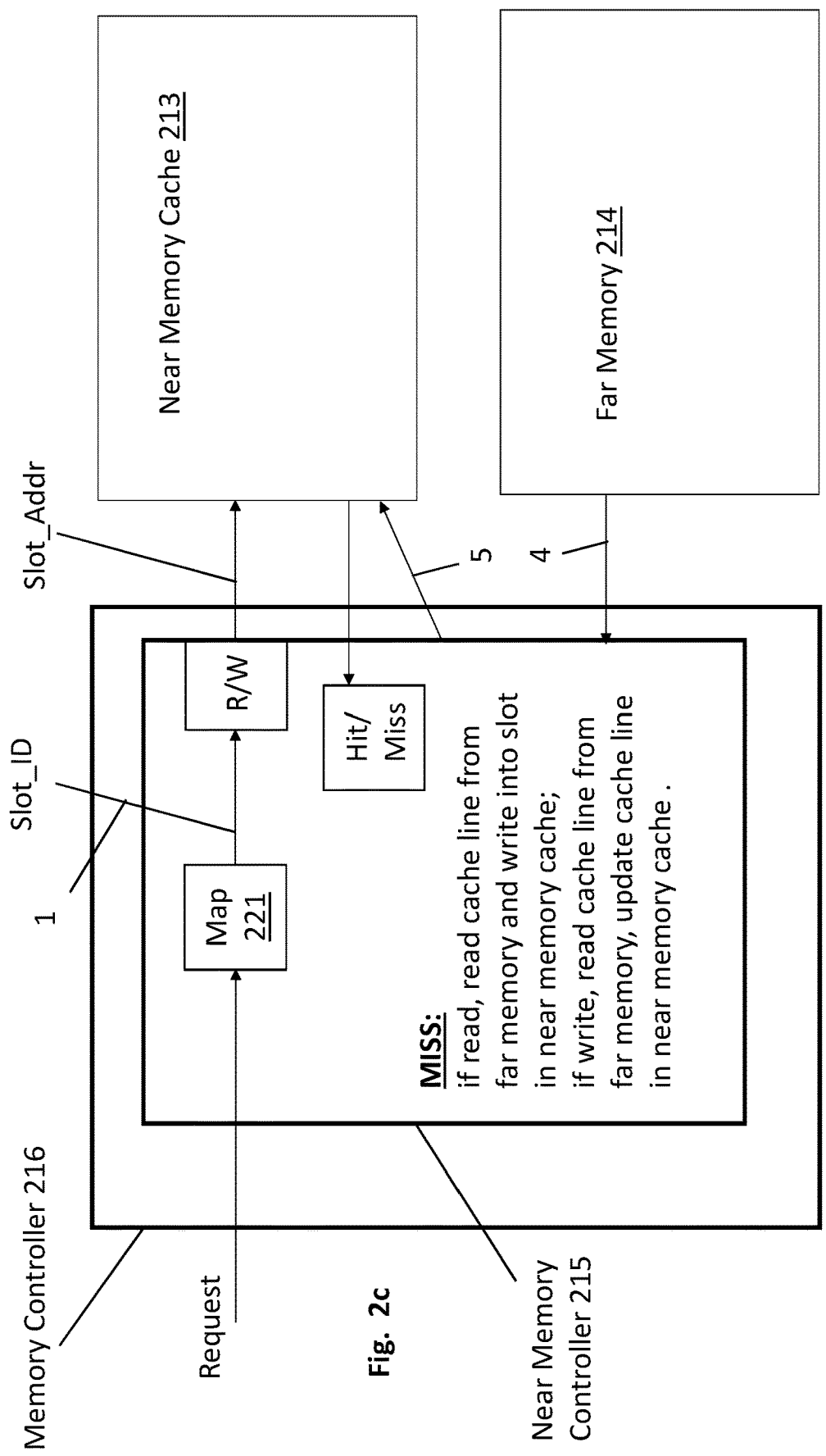

If there is a miss, referring to FIG. 2c, the request is serviced from far memory 214. That is, in the case of a read, the requested cache line is fetched 4 from far memory 214, forwarded to the requestor as a response to the request and written 5 into its corresponding slot in near memory cache 213. The writing of the fetched data into the near memory slot causes any valid data in the same slot to be evicted from the slot and written back to far memory 214. In the case of a write, the data is fetched 4 from far memory 214, updated with the new information and written 5 into its slot in near memory cache 213 (depending on machine configuration it may, or may not, also write a copy of the updated cache line into far memory 214).

A slot in near memory, however, may be configured to "pin" data. When a slot is pinned with data, the slot is deemed to be dedicated to only one of the addresses of the group of addresses that map to the slot. As such, all other addresses that map to the slot are blocked from accessing the slot.

In order to over-come what would otherwise be a total blocking of these other addresses from accessing near memory cache, the cache accessing scheme of FIGS. 2a through 2e recognizes a "partner slot" for any slot having pinned data. Here, referring to FIG. 2d, the addresses that are blocked from using their appropriate direct mapped slot ("original slot") because the slot is pinning data of another competing address are re-directed to the slot's partner slot in near memory cache 213.

The nominal cache hit/miss scenario is then executed from the partner slot. That is, a request whose address is redirected to its original slot's partner slot because the original slot is pinning the data of a competing address will be serviced by reading 6 the cache line in the partner slot. If there is a hit, in the case of a read, the cache line that was just read from the partner slot is used as the response to the request 7. In the case of a write, the data that was appended to the request is written over the data in the partner slot 8.

Figure 2E:
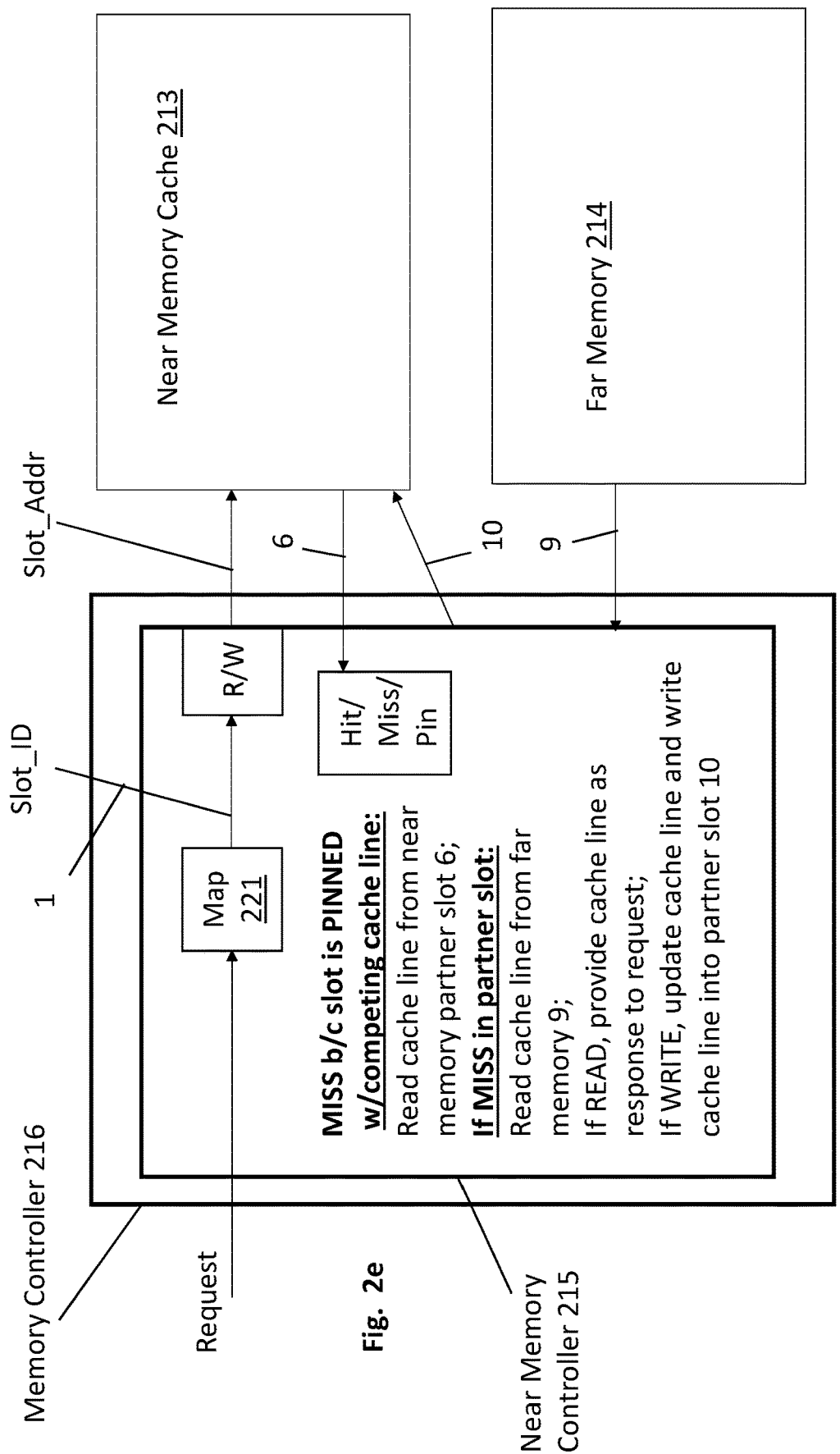

Referring to FIG. 2e, if there is a miss in the partner slot, in the case of a read, the requested data is fetched from far memory 9, provided as the response to the request and written 10 into the partner slot (which causes eviction of the data in the partner slot to far memory if it is valid). In the case of a write, the request data is fetched from far memory 9, updated with the new information and written into the partner slot 10 (which, again, causes eviction of the data in the partner slot to far memory if it is valid).

In essence, when an original slot is pinned, the "blocked" addresses that map to the original slot are "re-mapped" to the partner slot. The number of addresses that directly map to a partner slot therefore nearly double when an original slot is pinned. That is, without any pinning of the original slot, a first group of addresses map to the original slot and a second group of different addresses map to the partner slot (the second group views the partner slot as their original slot).

When the original slot pins the data of one of the addresses from the first group, however, the remaining ("blocked") addresses from the first group and the addresses of the second group map to the partner slot. The approach therefore increases contention amongst addresses for a same slot (the partner slot) when a slot pins data. However, the "blocked" addresses that map to the pinned slot are not blocked entirely from near memory access (they can compete for the partner slot amongst themselves and amongst the addresses that view the partner slot as their original slot).

As such, the cache accessing scheme is apt to work very well at least in environments where: 1) multiple addresses that map to a same slot are frequently being requested; 2) the slot is pinning data; and, 3) addresses that map to the partner slot as their original slot are only infrequently requested. In this case, across both groups of addresses that map to one of the pinned and partner slots, the most frequently requested ones of these addresses will still be serviced from near memory 213.

In an embodiment, a bit in the meta-data space of the cache line structure is used to specify whether the data is pinned or not. Thus, in an embodiment, micro-operation of the request response entails: 1) mapping a request to its original slot; 2) performing a read from the original slot; 3) reading the meta-data of the cache line read from the original slot and determining if the slot is pinned (by checking the "pinned bit" in the meta-data (e.g., pinned bit=0 means the slot is not pinning data, pinned bit=1 means the slot is pinning data); 4) if the slot is not pinning data, servicing the request from slot (determine from the just read meta-data if there is a cache hit or not) and proceeding according to nominal direct mapped cache operation in view of a cache hit or cache miss; 5) if the slot is pinning data, and there is a cache miss (the request does not target the pinned data), re-directing the request to the slot's partner slot and servicing the request from the partner slot (read the cache line in the partner slot, determine if there is a cache hit/miss and proceed according to nominal direct mapped cache operation).

If the there is a cache hit in the original slot and the original slot is pinning data (the target of the request is the pinned data), the pinned data is provided as the response in the case of a read, or, the pinned data is updated with the new information in the case of a write.

According to one embodiment, near memory cache 213 is structured so that partner slots cannot pin data. For example, a first half of the physical address space of near memory cache 213 is permitted to pin data and the second half of the physical address space of near memory cache 213 is not permitted to pin data, where, each slot in the second half serves as a partner to a unique one of the slots in the first half. Here, note that only half the capacity of the near memory cache 213 is available for pinning.

As such, higher priority applications and/or applications that would greatly benefit from pinning can be allocated system memory address space whose addresses map entirely or primarily to the first half, whereas, lesser priority applications and/or applications that would not greatly benefit from pinning can be allocated system memory address space in the second half.

Note that special hashing or no hashing at all of system memory addresses can be used to determine which original slot a particular system memory address maps such that a particular application's allocated system memory addresses map to a particular half of near memory.

For example, in the case of no hashing, system memory addresses are assigned in sequence within slots or across slots in a same half of near memory address space. In the case of the former (system memory addresses are assigned in sequence within slots), consecutive system memory addresses map to a same near memory cache slot. For example, if N different addresses are to map to a same slot, system memory addresses ADD+0, ADD+1, ADD+2, ADD+(N−1) map to the same cache line slot in near memory. An exception to this general definition exists in the case of consecutive system memory addresses where the first address corresponds to the last address to map to a particular slot and the next, immediately following address corresponds to the first address to map to the next slot.

As another example, system memory addresses map consecutively across near memory cache slots but the mapping "wraps" at the halfway mark across the near memory's slots or total address space. For example, if there M total slots in the near memory, system memory address ADD+0 maps to slot 0, system memory address ADD+1 maps to slot 1, system memory address ADD+2 maps to slot 2, etc., system memory address ADD+((M−1)/2) maps to slot (M−1)/2, system memory address ADD+(M/2) maps back to slot 0, system memory address ADD+((M+1)/2) maps to slot 1, etc. In this manner, consecutive system memory addresses are essentially distributed in a round robin fashion across one half of the near memory's cache line slots (or physical address space).

In the case of special hashing, hashing algorithms are employed that map consecutive/contiguous blocks of system memory address space to one (pinning capable) or the other (no pinning capability) halves of the near memory's cache line slots. As such, assigning an application to a consecutive/contiguous block of system memory should result in all of the application's memory requests being directed to only one of the near memory halves. Again, if the application is high priority or its performance would greatly benefit from pinning, a hashing algorithm that assigns its system memory address to the pinning capable half of near memory would be appropriate. By contrast, if the application is lesser priority or its performance would not greatly benefit from pinning, another different hashing algorithm is used that assigns system memory addresses to the not pinning capable half of near memory. If hashing is used, in order to effect a direct mapped cache, each system memory address should map to only one original slot in near memory.

In an embodiment, an original slot's partner is identified by "flipping" one bit in the original slot's physical near memory address. In a further embodiment, a highest ordered address bit is flipped. This approach is particularly useful if one half (e.g., the upper half) of the near memory address space is pinning capable while the other half (e.g., the lower half) is not pinning capable. As such, all pinning capable near memory addresses are of the form, e.g., 0XXX . . . X, and, all non pinning capable near memory addresses are of the form, e.g., 1XXX X. Again, the partner slot of any particular pinning capable slot, e.g., a slot having the specific address 0ABC N, is determined by flipping the highest ordered bit of the pinning capable slot: 1ABC . . . N.

Although embodiments above have emphasized one half of near memory as being pinning capable and the other half as not being pinning capable, in other embodiments, other portions of pinning capable vs. non pinning capable near memory may be implemented. In theory, any portion can be pinning capable with the remaining portion being non pinning capable. In embodiments where more than half near memory is pinning capable, a non pinning capable slot can be the partner slot for more than one pinning capable slot, and/or, a pinning capable slot can have a partner slot that is also pinning capable.

In embodiments where more than half the near memory is pinning capable, and/or, where an original slot's partner is also pinning capable, the cache accessing scheme should address the situation when the partner slot is also pinned. That is, for instance, a memory access request first maps to its original slot which is pinned with the data of a competing address. The request is then mapped to the original slot's partner slot which is also pinned with the data of another competing address. In this case, the request is directed to far memory. In the case of a read, the data read from far memory is not written into near memory (the address is effectively blocked from its original and partner slot). Likewise, in the case of a write, the data is written directly into far memory without writing an updated version into near memory.

Figure 3:
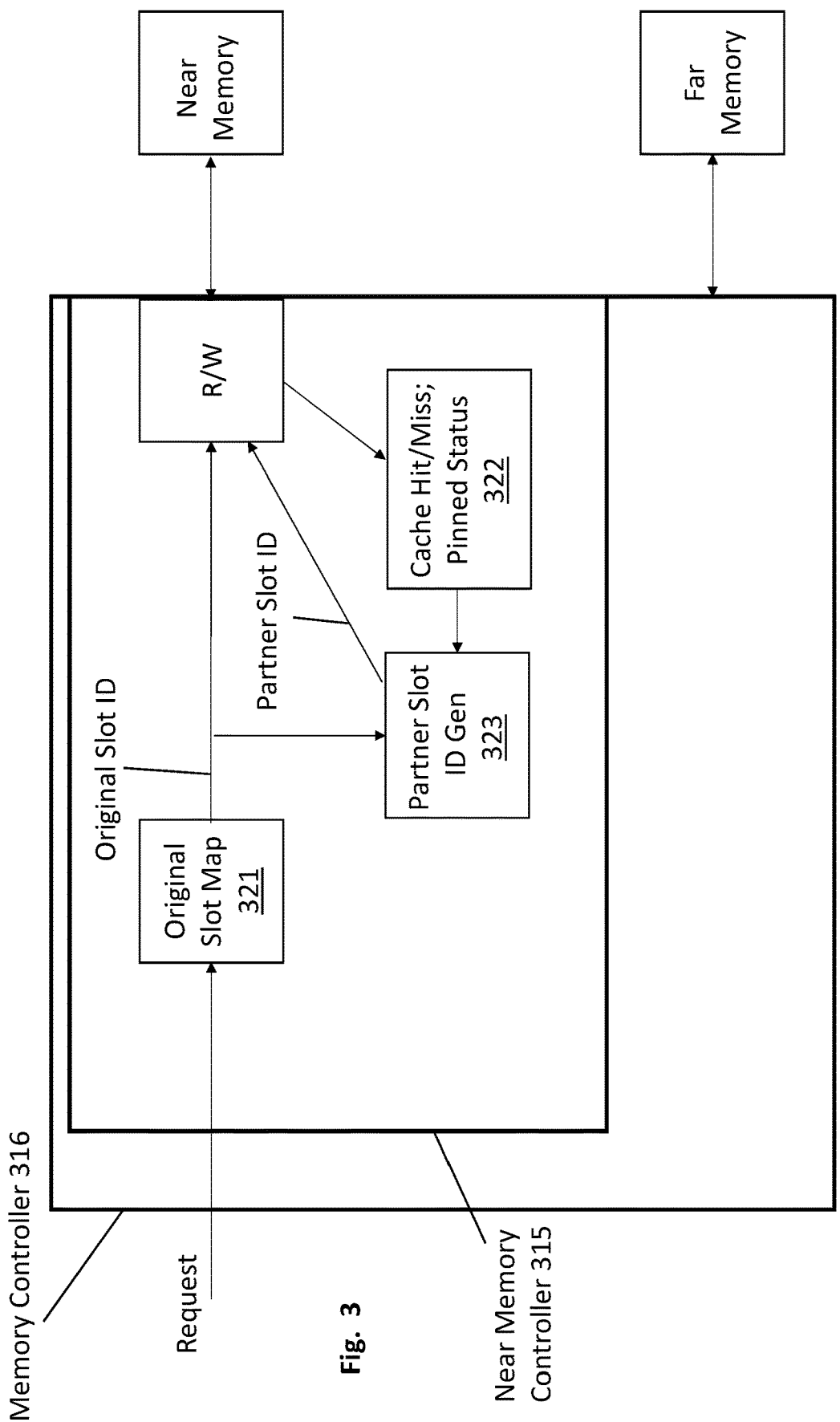
FIG. 3 shows a memory controller that can implemented the cache accessing scheme of FIGS. 2a through 2e.

FIG. 3 shows a system memory controller 316 that is designed to implement the caching scheme of FIGS. 2a through 2e or any of its variants as described above. As observed in FIG. 3, the memory controller 316 includes a near memory controller 315. The near memory controller 315 includes circuitry to implement the cache accessing scheme of FIGS. 2a through 2e or any of its variants. The near memory controller includes first mapping logic 321 that determines the original slot from the address of a memory request. The near memory controller 315 further includes hit/miss and pinning status logic circuitry 322 which determines from the meta-data of a read cache line not only whether there is a cache hit or miss but also whether the cache line is pinned. In the case of a miss in the original slot and where the original slot is pinned, the near memory controller will invoke second mapping logic circuitry 323 to identify the address of the appropriate partner slot and trigger a read of the cache line from the partner slot.

The near memory controller can also include register space (not shown) which the host sets to inform the memory controller as to which cache line is to be pinned into any particular slot. Alternatively, this information may be kept in a reserved portion of near memory or far memory.

Any of the aforementioned logic circuitry, which include any circuits 321, 322, 332 as well as the near memory controller 315 and memory controller 316 may be implemented as dedicated hardwired logic circuitry (hardwired logic gates, etc.), programmable logic circuitry (e.g., field programmable gate array (FPGA) logic circuitry), circuitry designed to execute some form of program code (e.g., an embedded controller, an embedded processor, etc.) and/or any combination of these.

Although embodiments above have stressed an application where the meta-data is kept in near memory, in various embodiments, some or all of the above described meta-data may be kept on the memory controller (e.g., in the near memory controller).

Figure 4:
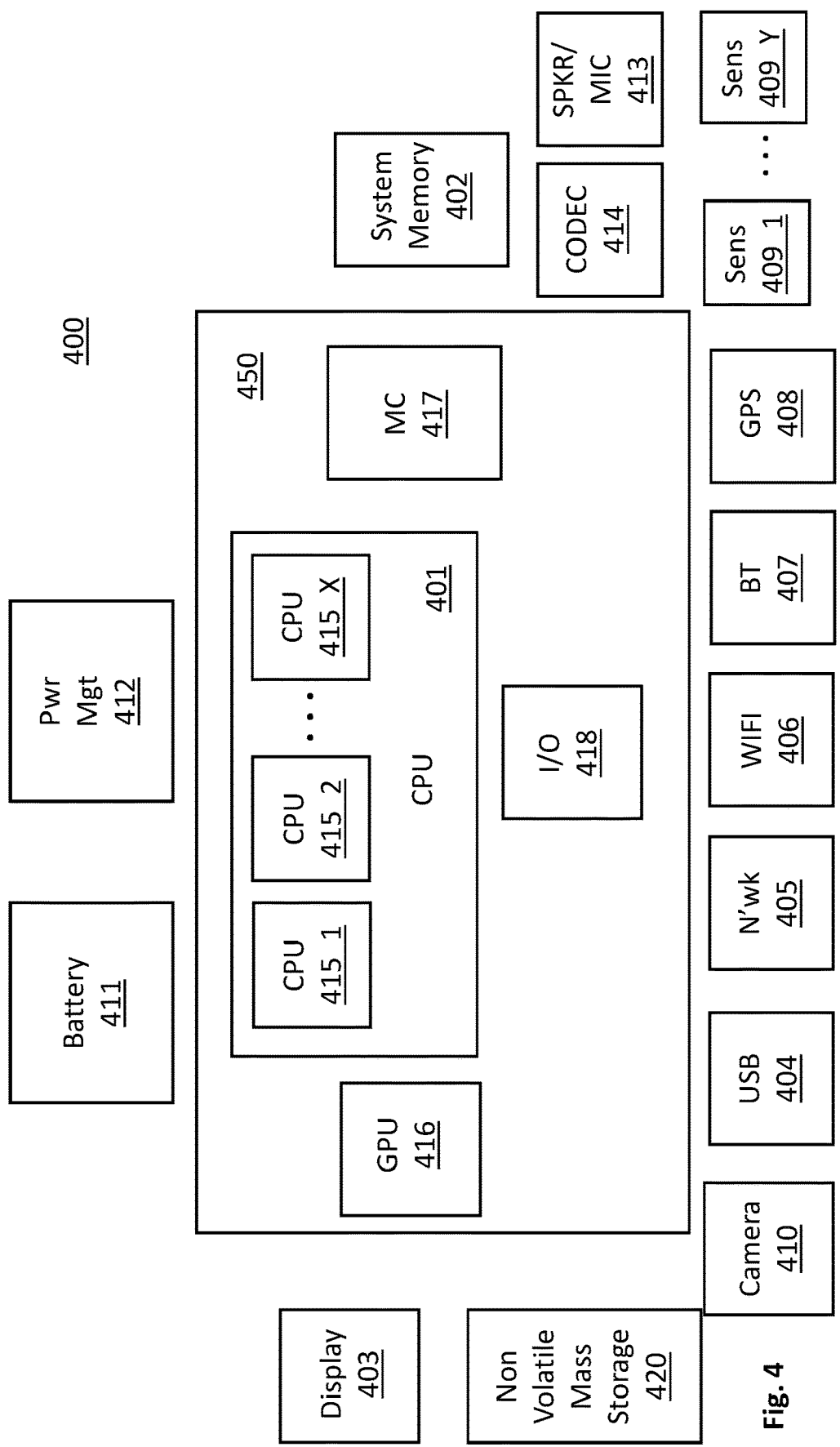
FIG. 4 shows a computing system.

FIG. 4 provides an exemplary depiction of a computing system 400 (e.g., a smartphone, a tablet computer, a laptop computer, a desktop computer, a server computer, etc.). As observed in FIG. 4, the basic computing system 400 may include a central processing unit 401 (which may include, e.g., a plurality of general purpose processing cores 415_1 through 415_X) and a main memory controller 417 disposed on a multi-core processor or applications processor, system memory 402, a display 403 (e.g., touchscreen, flat-panel), a local wired point-to-point link (e.g., USB) interface 404, various network I/O functions 405 (such as an Ethernet interface and/or cellular modem subsystem), a wireless local area network (e.g., WiFi) interface 406, a wireless point-to-point link (e.g., Bluetooth) interface 407 and a Global Positioning System interface 408, various sensors 409_1 through 409_Y, one or more cameras 410, a battery 411, a power management control unit 412, a speaker and microphone 413 and an audio coder/decoder 414.

An applications processor or multi-core processor 450 may include one or more general purpose processing cores 415 within its CPU 401, one or more graphical processing units 416, a memory management function 417 (e.g., a memory controller) and an I/O control function 418. The general purpose processing cores 415 typically execute the system and application software of the computing system. The graphics processing unit 416 typically executes graphics intensive functions to, e.g., generate graphics information that is presented on the display 403.

The memory control function 417 interfaces with the system memory 402 to write/read data to/from system memory 402. The system memory may be implemented as a multi-level system memory. The memory controller may include a near memory controller that implements a direct mapped caching scheme with some associativity to prevent total blocking of cache lines when a competing cache line has been pinned in the near memory as described at length above.

Each of the touchscreen display 403, the communication interfaces 404-407, the GPS interface 408, the sensors 409, the camera(s) 410, and the speaker/microphone codec 413, 414 all can be viewed as various forms of I/O (input and/or output) relative to the overall computing system including, where appropriate, an integrated peripheral device as well (e.g., the one or more cameras 410). Depending on implementation, various ones of these I/O components may be integrated on the applications processor/multi-core processor 450 or may be located off the die or outside the package of the applications processor/multi-core processor 450. The power management control unit 412 generally controls the power consumption of the system 400.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
 a memory controller to interface with a multi-level memory, where, an upper level of the multi-level memory is to act as a cache for a lower level of the multi-level memory, the memory controller comprising circuitry to determine the following in response to a memory request:

i) an original address of a slot in the cache from an address of the memory request in a direct mapped fashion;
ii) a miss in the cache for the memory request because the slot is pinned with data from another address that competes with the address;
iii) a partner slot of the slot in the cache in response to the miss, wherein, the partner slot and the slot reside at a same caching level that is the cache's caching level, and wherein, because the slot is pinned, a set of addresses that map to the slot in the direct mapped fashion, and that do not include the another address, also map to the partner slot in the direct mapped fashion;
iv) whether there is a hit or miss in the partner slot in the cache for the memory request; and, wherein the memory controller is further to, if the memory request is a read request and if there is also a miss in the partner slot because the partner slot is pinned with second data from a second other address, perform the following in response to the memory request: read third data from the lower level of the multi-level memory, provide the third data as a response to the memory request and not write the third data into the partner slot.

2. The apparatus of claim 1 wherein the memory controller is further to, if the memory request is a read request and if there is also a miss in the partner slot but the partner slot is not pinned, read third data from the lower level of the multi-level memory and provide the third data as a response to the memory request.

3. The apparatus of claim 2 wherein the memory controller is also to write the third data into the partner slot.

4. The apparatus of claim 1 wherein the memory controller is further to, if the memory request is a write request and if there is also a miss in the partner slot, read the memory request's data from the lower level of the multi-level memory, update the memory request's data and write the updated memory request's data into the partner slot.

5. The apparatus of claim 1 wherein the memory controller is further to, if the memory request is a read request and if there is a hit in the partner slot, provide the second data from the partner slot as a response to the memory request.

6. The apparatus of claim 1 wherein the memory controller is further to, if the memory request is a write request and if there is a hit in the partner slot, update the partner slot with the memory request's new data.

7. The apparatus of claim 1 wherein the upper level of the multi-level memory is composed of DRAM and the lower level of the multi-level memory is composed of byte addressable non-volatile memory.

8. The apparatus of claim 1 wherein the cache is partitionable into original slots and partner slots of the original slots.

9. The apparatus of claim 8 wherein the original slots consume 50% of the cache.

10. A computing system, comprising:
a processor;
a multi-level memory, the multi-level memory comprising an upper level that is to act as a cache for the lower level;
a memory controller coupled between the processor and the multi-level memory, the memory controller comprising circuitry to determine the following in response to a memory request:
i) an original address of a slot in the cache from an address of a memory request in a direct mapped fashion;
ii) a miss in the cache for the memory request because the slot is pinned with data from another address that competes with the address;
iii) a partner slot of the slot in the cache in response to the miss, wherein, the partner slot and the slot reside at a same caching level that is the cache's caching level, and wherein, because the slot is pinned, a set of addresses that map to the slot in the direct mapped fashion, and that do not include the another address, also map to the partner slot in the direct mapped fashion;
iv) whether there is a hit or miss in the partner slot in the cache for the memory request; and, wherein the memory controller is further to, if the memory request is a read request and if there is also a miss in the partner slot because the partner slot is pinned with second data from a second other address, perform the following in response to the memory request: read third data from the lower level of the multi-level memory, provide the third data as a response to the memory request and not write the third data into the partner slot.

11. The computing system of claim 10 wherein the memory controller is further to, if the memory request is a read request and if there is also a miss in the partner slot but the partner slot is not pinned, read third data from the lower level of the multi-level memory and provide the third data as a response to the memory request.

12. The computing system of claim 11 wherein the memory controller is also to write the third data into the partner slot.

13. The computing system of claim 10 wherein the memory controller is further to, if the memory request is a write request and if there is also a miss in the partner slot, read the memory request's data from the lower level of the multi-level memory, update the memory request's data and write the updated memory request's data into the partner slot.

14. The computing system of claim 10 wherein the memory controller is further to, if the memory request is a read request and if there is a hit in the partner slot, provide the second data from the partner slot as a response to the memory request.

15. The computing system of claim 10 wherein the memory controller is further to, if the memory request is a write request and if there is a hit in the partner slot, update the partner slot with the memory request's new data.

16. The computing system of claim 10 wherein the upper level of the multi-level memory is composed of DRAM and the lower level of the multi-level is composed of byte addressable non-volatile memory.

17. The computing system of claim 10 wherein the cache is partitionable into original slots and partner slots of the original slots.

18. A method, comprising:
performing the following in response to a memory request with a memory controller that interfaces with a multi-level memory having an upper level and a lower level where the upper level acts as a cache for the lower level:
i) determining an original address of a slot in the upper level of the multi-level memory from an address of a memory request in a direct mapped fashion;
ii) determining a miss in the cache for the memory request because the slot is pinned with data from another address that competes with the address;
iii) determining a partner slot of the slot in the cache in response to the miss, wherein, the partner slot and the slot reside at a same caching level that is the cache's caching level, and wherein, because the slot is pinned, a set of addresses that map to the slot in the direct mapped fashion, and that do not include the another address, also map to the partner slot in the direct mapped fashion;

iv) determining there is a miss in the partner slot in the cache for the memory request because the partner slot is pinned with second data from a second other address;

v) reading third data targeted by the memory request from the lower level of the multi-level memory, the memory request being a read request; and, vi) providing the third data as a response to the memory read request and not writing the data into the partner slot.

* * * * *